United States Patent [19]

Noto

[11] Patent Number: 5,249,252
[45] Date of Patent: Sep. 28, 1993

[54] OPTICAL FIBER SPLICE TRAY WITH CABLE TRAY HINGE

[75] Inventor: Anthony P. Noto, Knightdale, N.C.

[73] Assignee: Alcatel Network Systems, Inc., Richardson, Tex.

[21] Appl. No.: 938,375

[22] Filed: Aug. 31, 1992

[51] Int. Cl.⁵ .............................................. G02B 6/36
[52] U.S. Cl. ................................... 385/135; 385/134; 385/137
[58] Field of Search ............... 385/134, 135, 136, 137, 385/138, 139

[56] References Cited

U.S. PATENT DOCUMENTS

| | | | |
|---|---|---|---|
| 4,708,430 | 11/1987 | Donaldson et al. | 385/135 |
| 4,971,421 | 11/1990 | Ori | 385/135 |
| 5,037,167 | 8/1991 | Beaty | 385/147 |
| 5,142,607 | 8/1992 | Petrotta et al. | 385/135 |
| 5,142,661 | 8/1992 | Grant et al. | 385/135 |

Primary Examiner—John D. Lee
Assistant Examiner—Phan T. Heartney
Attorney, Agent, or Firm—Bruce C. Lutz; Dennis O. Kraft

[57] ABSTRACT

An optical splice shelf (10) has optical splice trays (24, 26, 28, 30) stacked inside a frame assembly (14) slidingly withdrawable from a rear panel (12) and attached thereto with cable tray hinge (80) for maintaining no less than a minimum bend radius of optical fibers routed between the rear of the frame assembly and the rear panel; upon withdrawal, the frame assembly can be pivoted downward to expose the rear panel and the back of the frame assembly.

8 Claims, 13 Drawing Sheets

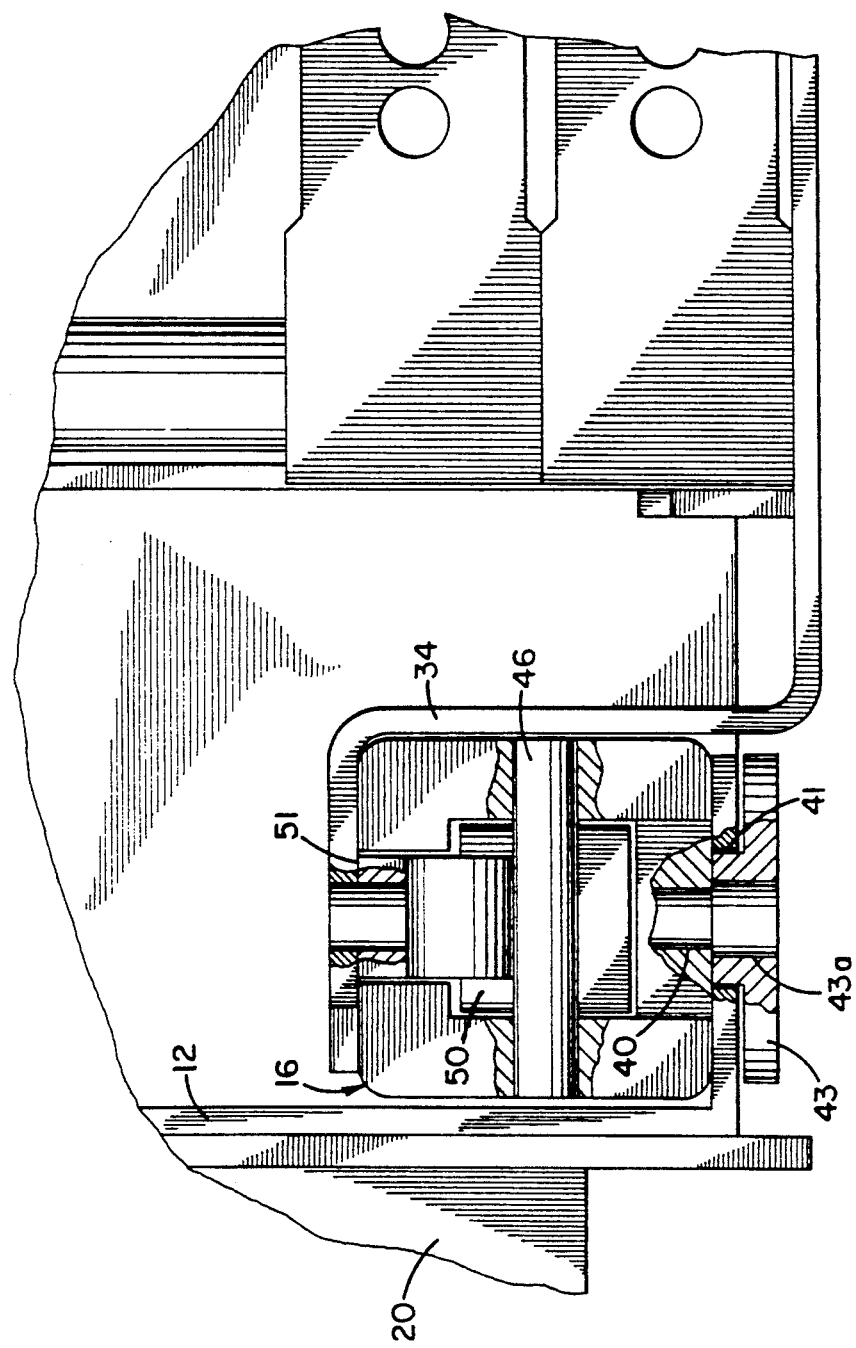

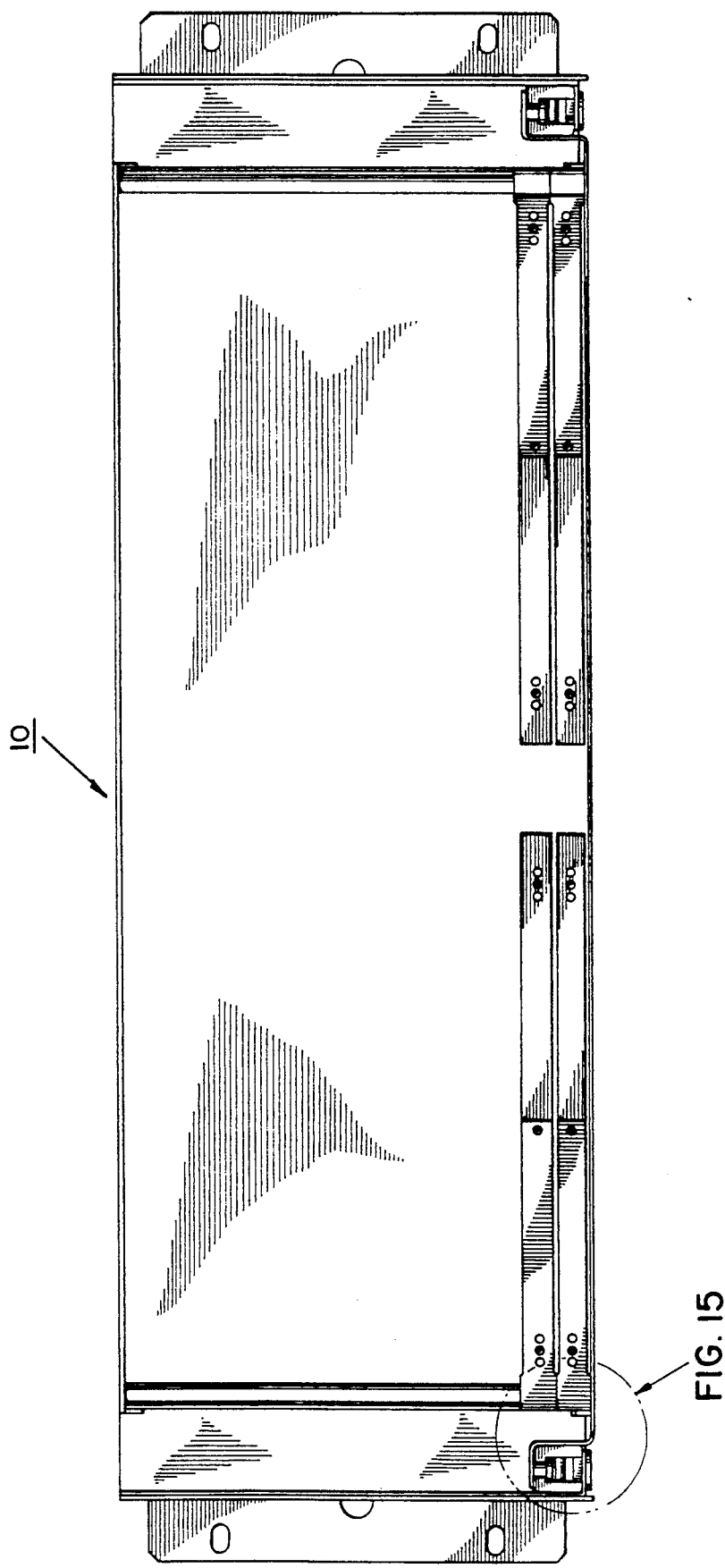

FIG. 21
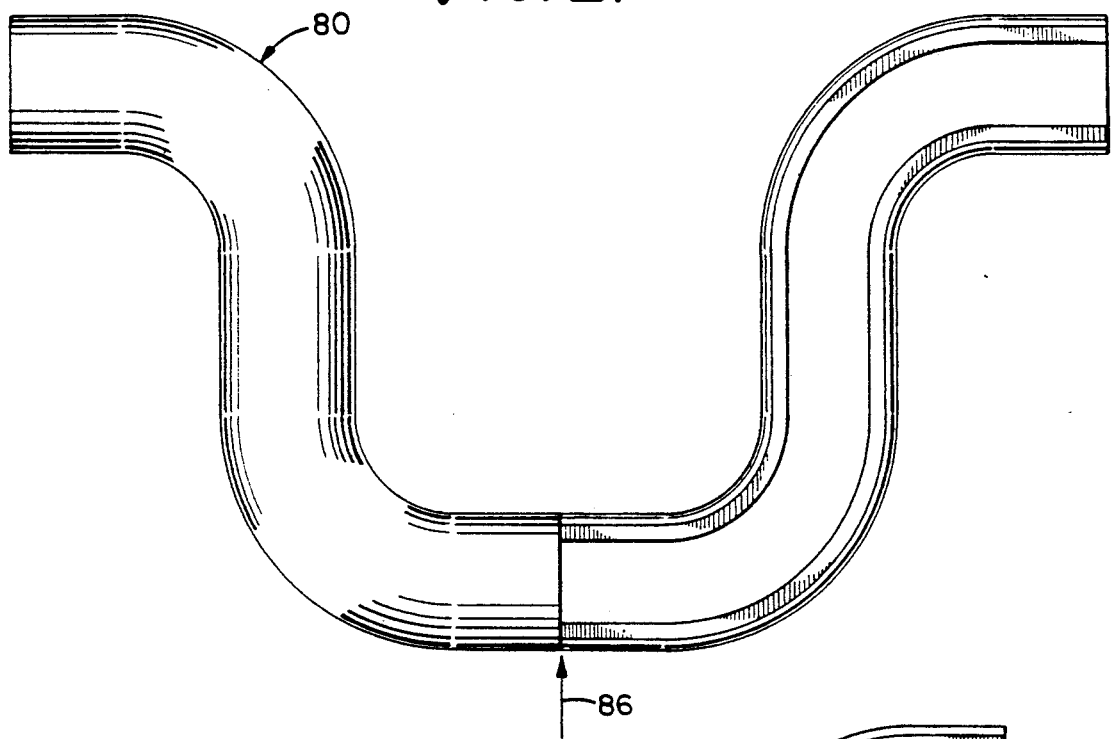
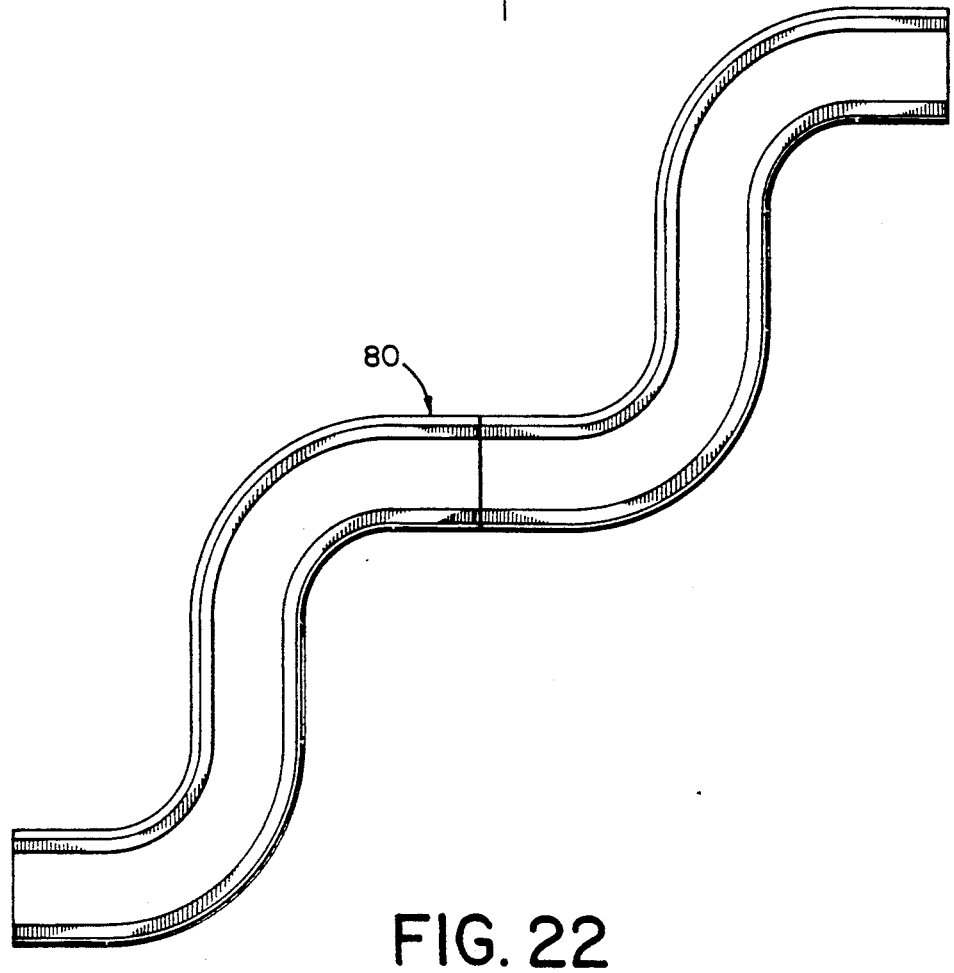
FIG. 22

OPTICAL FIBER SPLICE TRAY WITH CABLE TRAY HINGE

TECHNICAL FIELD

This invention relates to optical fiber distribution and, more particularly, to optical splice storage compartments.

BACKGROUND OF THE INVENTION

An optical splice shelf is a storage compartment for optical splices and their related fibers. Most available models have slide out or swing out trays. Each tray typically stores up to twelve splices and measures approximately 41 cm wide by 23 cm deep by 2.5 cm high. At the center of the tray is a splice holder which secures the splices Excess fiber generally is looped around the inside walls of the tray. All of the incoming and outgoing fibers are bundled together with spiral wrap. The trays are supported by a frame, typically approximately 53 cm wide (for insertion in equipment racks of that size) and as high as six rack-spaces where one rack-space equals approximately 4.5 cm.

Shortcomings of existing optical splice shelves are that they (1) restrict all air flow which may be required if a unit is mounted between electronic equipment; (2) make difficult any access to add or change fibers because all fibers are bundled in a spiral wrap or tube; (3) underutilize space since the splice density (number of splices and fibers per unit volume of rack space) is low, usually on the order of well over four hundred cubic centimeters per splice; (4) poorly organize fibers and splices; (5) fail to guarantee a high degree of protection for maintaining a minimum fiber bend radius, for example, of about 3.8 cm for one type of fiber.

DISCLOSURE OF INVENTION

An object of the present invention is to promote air flow in an optical splice shelf.

Another object of the present invention is to provide full front access to an optical splice shelf.

Still another object of the present invention is to provide an optical splice shelf that permits high splice density.

Another object of the present invention is to promote easy labeling and organization of fibers in a splice shelf.

Still another object of the present invention is to guarantee no less than a minimum bend radius for fibers in the shelf.

According to the present invention, air flow is permitted between trays by perforating horizontally oriented materials.

In further accord with the present invention, an optical splice shelf is provided with a slide-out/swing-down shelf that exposes all fibers at the back and sides of the shelf. The fibers may be routed throughout the shelf and trays with snap-in type wire guides. Full front access allows easy traceability, addition, or removal of individual fibers.

In still further accord with the present invention, a four rack-space high shelf (approximately 18 cm high) holds twenty-eight splice trays which individually swing out for access. Each tray can, for example, hold up to five splices and up to 1.5 meters of associated non-jacketed fiber using nine hundred micron buffer tube. This equates to about two hundred and thirteen cubic centimeters per splice. Changeable splice holders for mounting in the trays can come in many configurations including versions that will hold three splices and a wave division multiplexer (WDM) or various other high density connectors.

In further accord with the present invention, the fibers may be arranged in snap-in guides and fanned out to enter the splice trays. This allows easy labeling and organization.

In still further accord with the present invention, throughout the shelf, fibers are guided three dimensionally to guarantee no less than a minimum bend radius, e.g., 3.8 cm. To accomplish this, along the rear panel of the shelf there may be mounted snap-in guides. From there they enter a cable tray hinge, again with snap-in guides. The hinge allows the shelf to slide out without compromising the fiber bend radius. At the back of the shelf, more snap-in guides take the fiber around a radiused corner to a side wall where they are fanned out and enter a front corner of the splice trays. Once in a tray, they are looped around inner walls and terminated at the splice. The tray guides also retain the fiber in three dimensions.

In further accord with the present invention, an optical splice shelf is comprised of a rear panel, a frame assembly, slide mechanisms, mounting brackets, one or more cable tray hinges, and a plurality of splice tray assemblies.

These and other objects, features and advantages of the present invention will become more apparent in light of the detailed description of a best mode embodiment thereof, as illustrated in the accompanying drawing

BRIEF DESCRIPTION OF THE DRAWING

FIG. 15 is a detail of FIG. 16 and shows the guide device of FIGS. 17-20 and the vertical retainer of FIGS. 12-14 assembled to guide the frame assembly and to attach the channel to the rear panel, respectively.

FIG. 16 shows a front view of the optical splice tray of FIG. 1 showing the location of the detail shown in FIG. 15.

FIG. 21 shows a front view of a cable tray hinge in the closed position.

FIG. 22 shows a top view of a cable tray hinge in the open position.

BEST MODE FOR CARRYING OUT THE INVENTION

Figure 1:
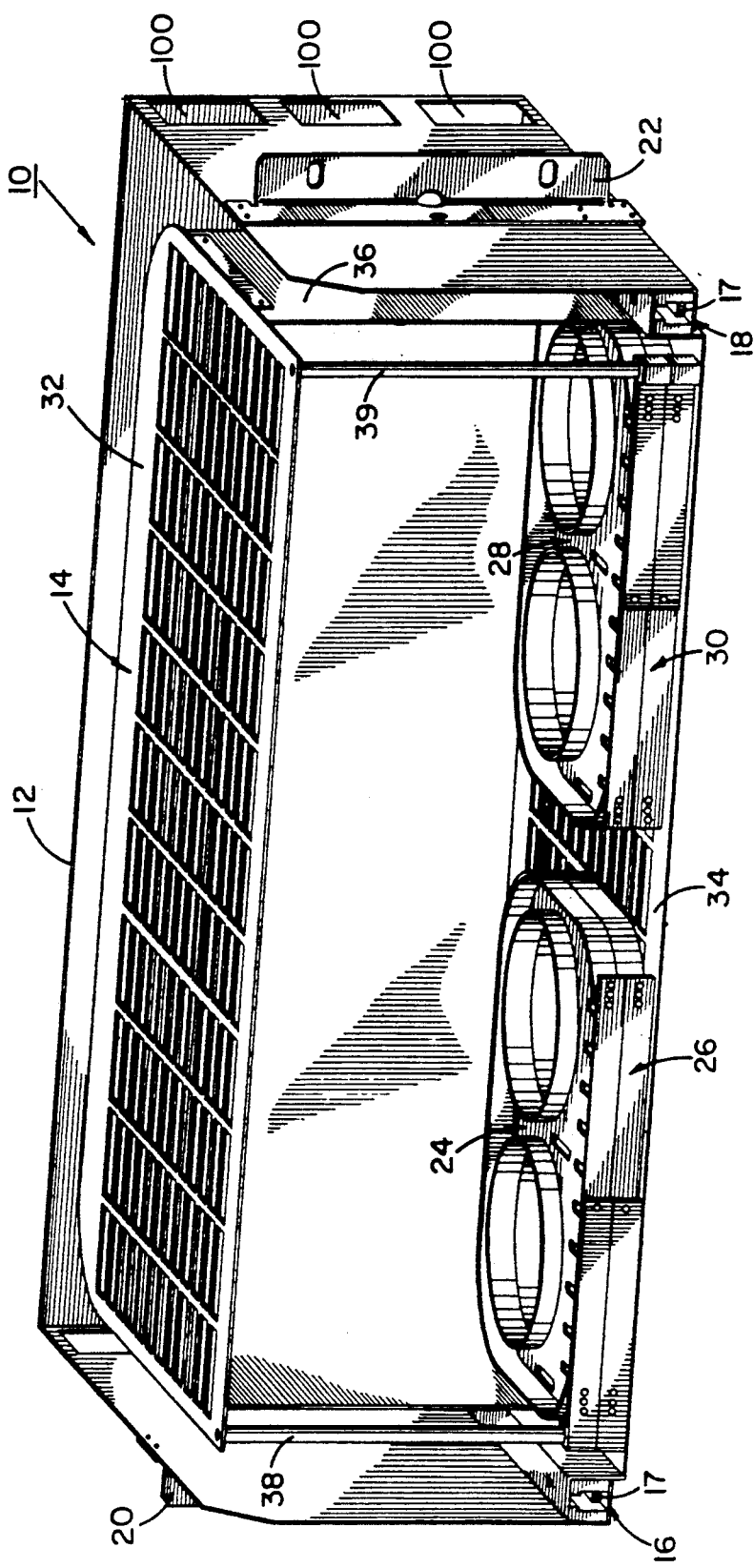
FIG. 1 shows an embodiment of an optical splice shelf, according to the present invention.

FIG. 1 shows an embodiment of an optical splice shelf 10, according the present invention. The embodiment is comprised of a rear panel 12, a frame assembly 14, a slide mechanism 16 having a channel 17 and a similar slide mechanism 18 on an opposite side of the frame assembly, two mounting brackets 20, 22, at least one cable tray hinge in between the rear wall of the frame assembly 14 and the rear wall of the rear panel 12 (not shown in FIG. 1; see FIGS. 21 and 22), and a plurality of splice tray assemblies 24, 26, 28, 30. The optical splice shelf 10 embodiment shown in FIG. 1 is capable of having up to twenty-eight splice tray assemblies and it will be understood that only four such assemblies 24, 26, 28, 30 are shown in FIG. 1.

Figure 2:
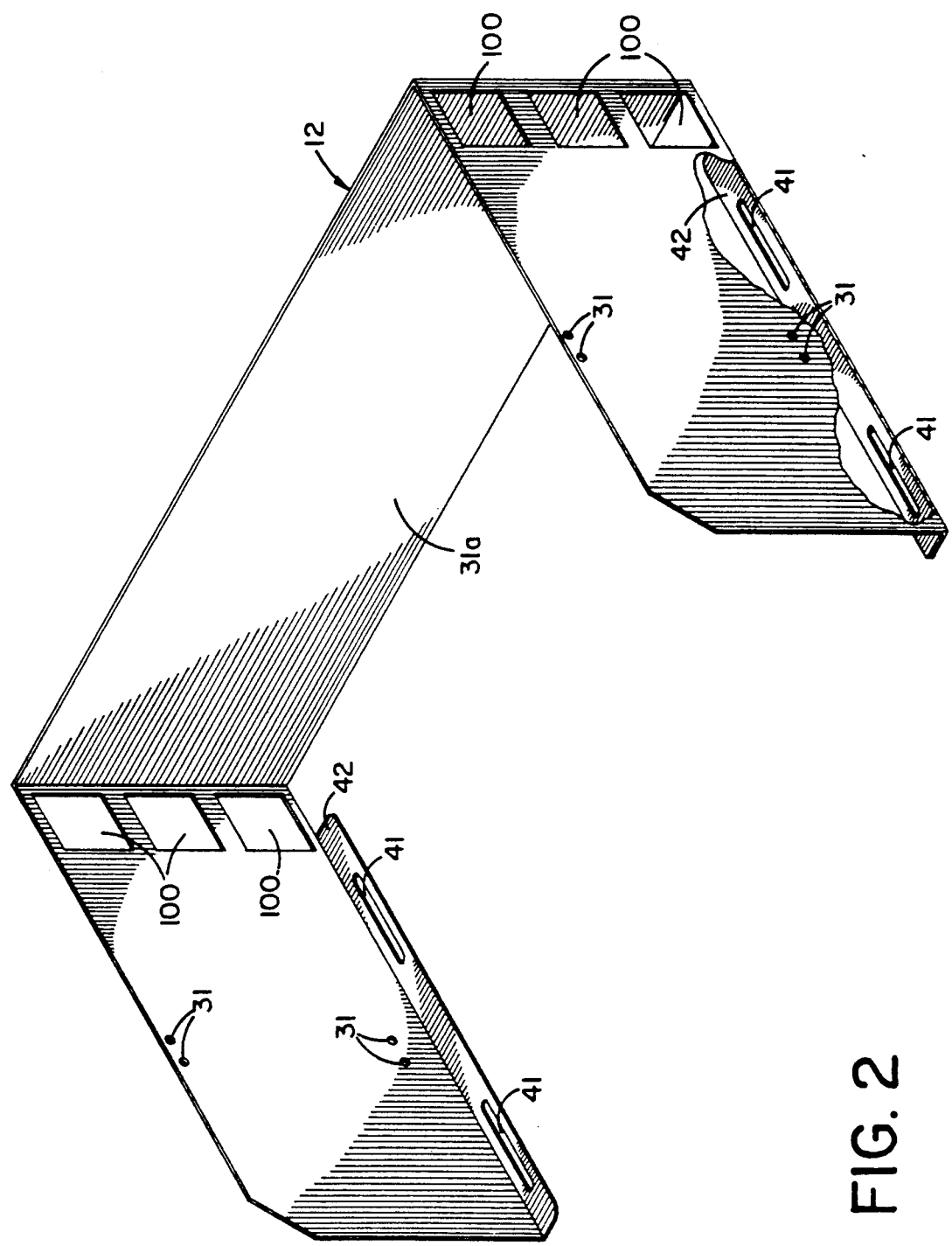
FIG. 2 shows the rear panel of the optical splice shelf embodiment of FIG. 1.

FIG. 2 shows the rear panel 12, which is the portion of the shelf that remains fixed in a rack (not shown). It is inserted into a rack and attached with attachment means such as screws used to fasten the mounting bracket 20, 22 shown in FIG. 1 to the rack. Holes 31 are shown in opposite sides of the rear panel 12 for attaching the mounting brackets 20, 22 to the sides. On the inside rear wall 31a of the rear panel 12 may be attached a cable clamp (not shown), fiber guides (not shown) and an attachment (not shown) for the cable tray hinge to be described below.

Figure 7:
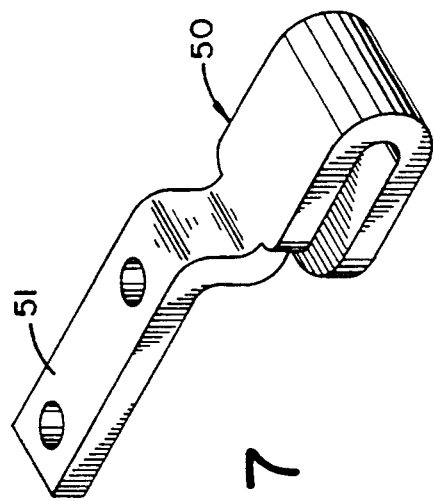

Referring back to FIG. 1, the frame assembly 14 is comprised of a top 32, a bottom 34, a main body 36, two pivot hooks to be described below (see FIGS. 7 and 11), vertical retainers to be described below (see FIGS. 3 and 14) for retaining the frame assembly within the rear panel while inside thereof and two rods 38, 39 mounted vertically in the front corners of the assembly.

Figure 3:
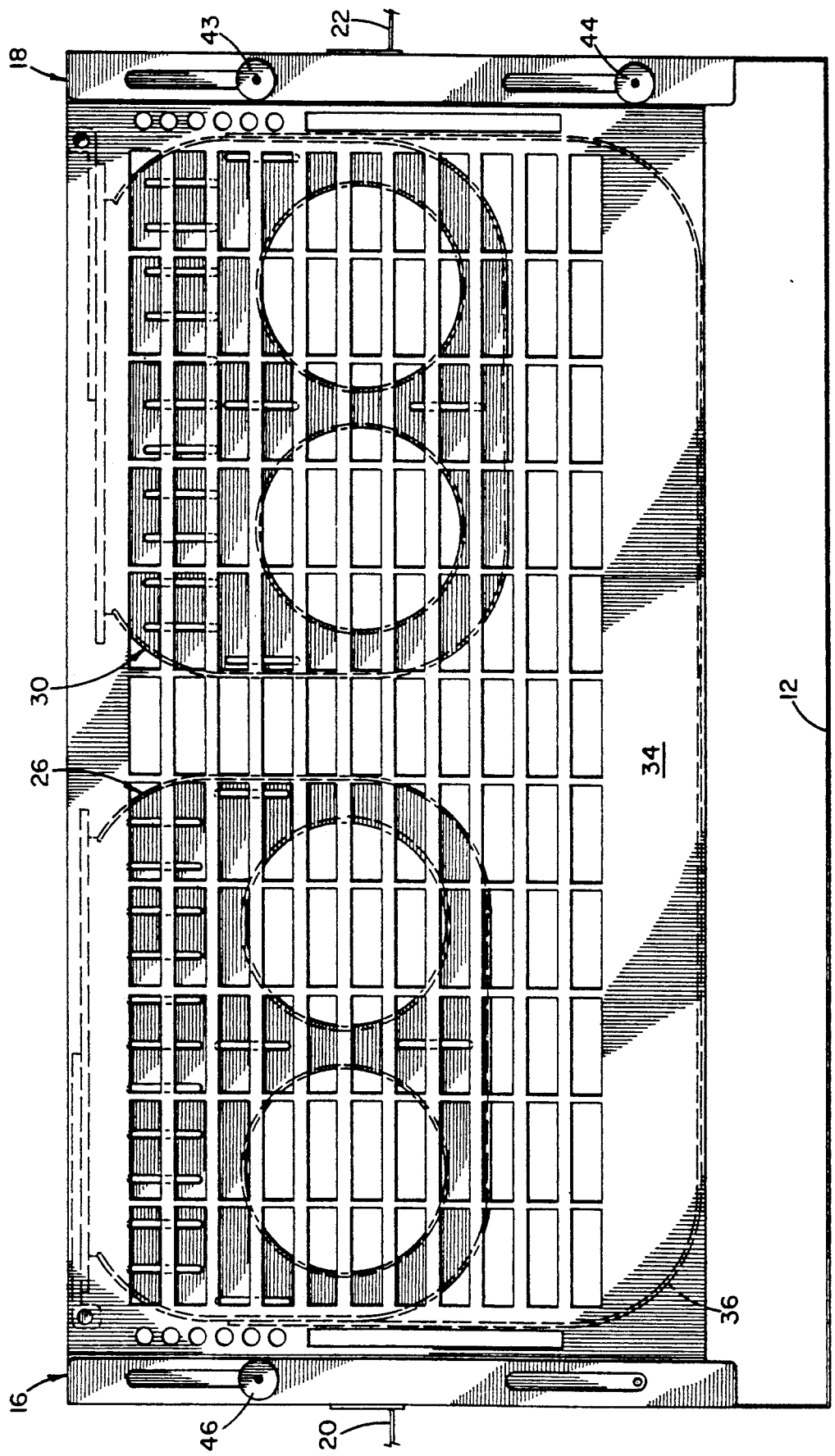
FIG. 3 shows a bottom view of the optical splice shelf embodiment of FIG. 1.
Figure 4:
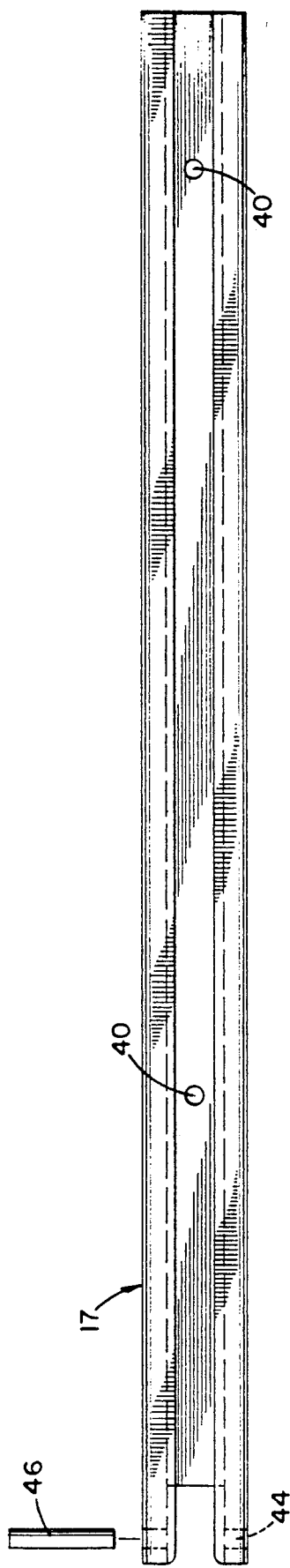
FIG 4 and 5 show top and side views, respectively, of a channel part of a slide mechanism for allowing the frame assembly to slide within the rear panel while guiding and retaining same along a straight path.
Figure 5:
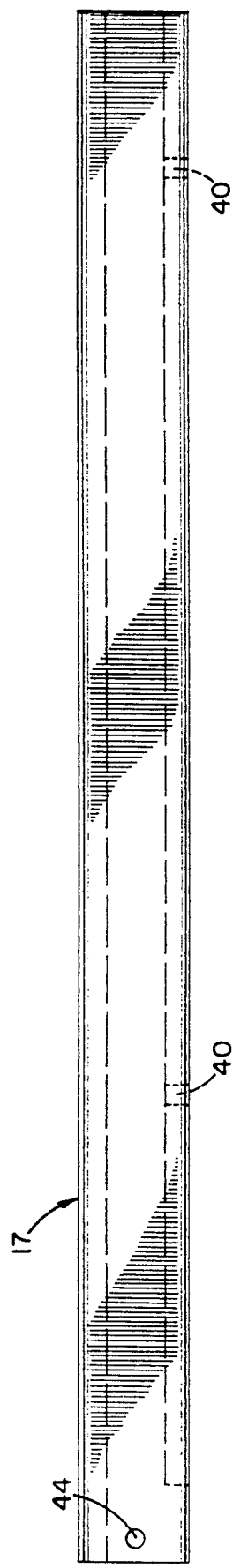
Figure 6:
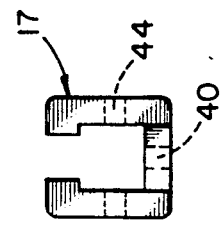
FIG. 6 shows a sectional view of the channel of FIGS. 4 and 5.
Figure 8:
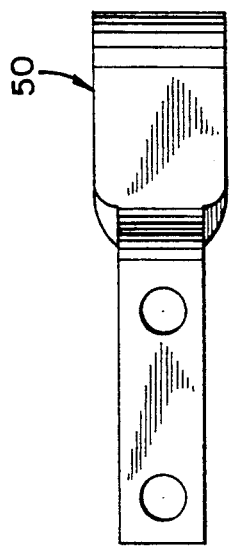
FIGS. 7-10 show perspective, top, side and end views of a hook attached to the bottom rear end corners of the frame assembly and inserted inside the channel of FIGS. 4-6 for sliding within the channel until it reaches a pin which the hook engages for allowing the frame assembly to pivot downward by up to ninety degrees to allow full front access to the rear panel.
Figure 9:
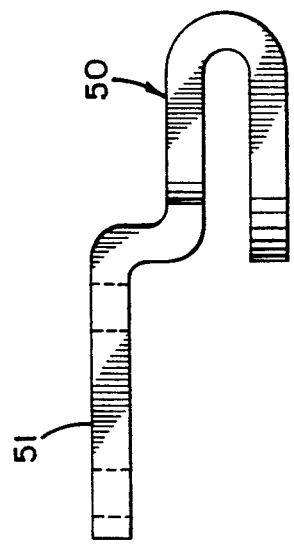
Figure 10:
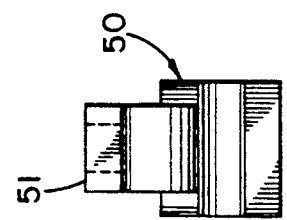
Figure 11:
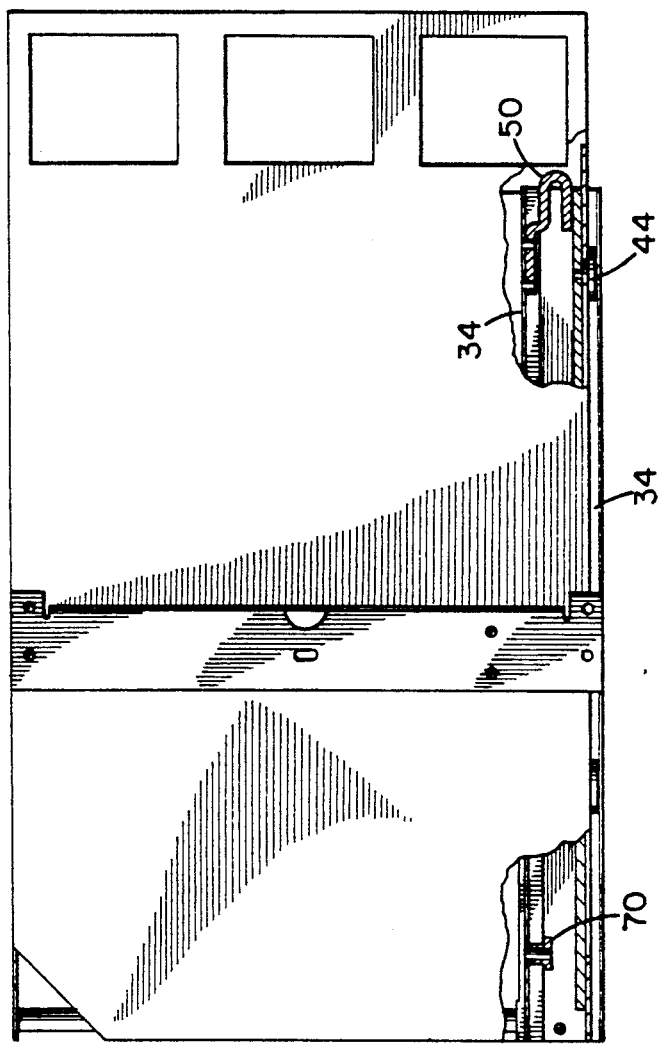
FIG. 11 shows a side view of the optical splice shelf embodiment of FIG. 1.
Figure 17:
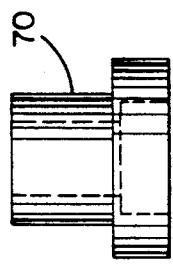
FIG. 17-20 shows a guide device which slides within the channel and is attached to the bottom of the frame assembly.
Figure 19:
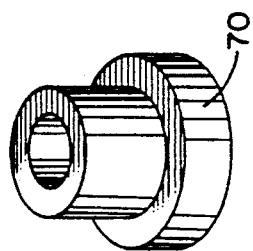
Figure 18:
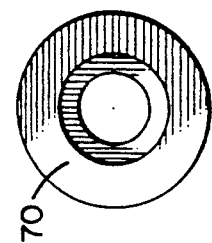
Figure 20:
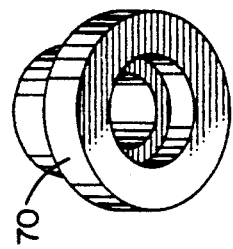

FIG. 3 shows a bottom view of the optical splice shelf embodiment 10 of FIG. 1. There, the slide mechanisms are better shown as having channels having longitudinal openings. FIGS. 4 and 5 show details of a typical channel 17 having through holes 40 which are positioned over slots 41 in lower ledges or flanges 42 of the rear panel 12. Vertical retainers 43, 44 are attached to the channel 17 through the slots 41 and the holes 40 in the channel 17. This allows the channel to slide with respect to the stationary rear panel to the extent allowed by the slots 41 while at the same time being retained to the rear panel. Similarly, a vertical retainer 46 is associated with slide mechanism 18, as shown. A top view of the typical channel 17 is shown in FIG. 4 while FIG. 5 shows a side view thereof. The vertical retainers of the slide mechanisms 16, 18 may be attached to the rear panel 12 flanges 42 by means of screws or other attachment means. FIG. 6 shows an end view of the typical channel 16. FIG. 6 also shows a through hole 44 which is also shown in FIG. 4 located at the end of the channel for holding a pin 46 shown in FIG. 4. A hook such as the hook 50 (shown in perspective in FIG. 7 and from a top view in FIG. 8, from a side view in FIG. 9 and from an end view in FIG. 10) is attached by attachment means (that pass through the longitudinal opening of the channel) to a rear corner of the bottom 34 of the frame assembly A top portion 51 of the hook, as shown in FIGS. 9, 11 and 15, slides within the longitudinal opening. The hook 50 is inserted into the end of the channel as shown, for example, in FIG. 11 by channel 17 having the hook 50 inserted therein at a back end thereof. As the frame assembly 14 is slid out of the rear panel 12, the hook slides within the channel until it reaches the pin 46. At the same time, the channel may slide or may commence sliding before the pin is engaged by the hook. Once the frame assembly and the channels have been fully extended, the hook engages the pin and the frame is allowed to pivot on the pin as it executes up to a ninety degree rotation. This allows access to the inside of the rear panel 12 and to the back and sides of the frame assembly itself.

Figure 14:
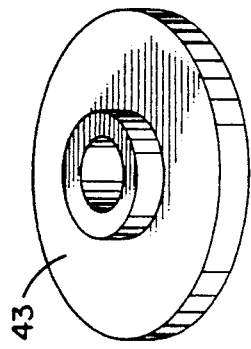
FIGS. 12-14, show side, top and perspective views of a vertical retainer used for attaching the channel of FIG. 4 and 5 to the rear panel through slots through a flange thereof.
Figure 12:
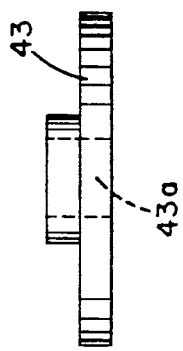
Figure 13:
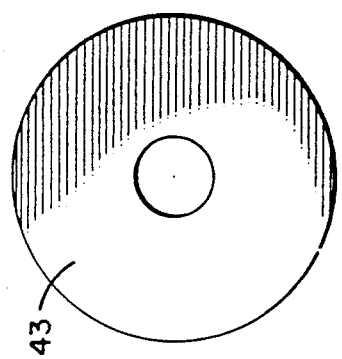

The vertical retainer 43 is shown in section in FIG. 12 and as a top view in FIG. 13. A perspective view is shown in FIG. 14. The retainer 43 is typical of the other retainers 44, 46 and of other retainers which may be provided if desired (not shown). FIGS. 17-20 show a guide device 70 which is placed within each of the channels 17 of the slide mechanisms 16, 18 as shown, for example, in FIG. 11. The guide device 70 is attached to the bottom 34 of the frame assembly and the top part thereof slides within the longitudinal opening of the channel while the bottom part slides within the channel but extends within the channel only so far as not to interfere with the pin 46 so as to allow withdrawal of the frame assembly from the rear panel. The bottom 34 of the frame assembly, as shown in FIG. 15, forms an angle to which may be attached the guide device 70 (not shown in FIG. 15) which fits inside the longitudinal cavity of the U-channel of the slide mechanism channel 16, as may be visualized with reference to FIG. 11. Such may be attached by a screw or any other convenient method which passes through the longitudinal opening of the box shaped channel. Shown in FIG. 15 is the vertical retainer 43 of FIG. 3 which is attached to the bottom of the channel of the slide mechanism 16 channel 17 through one of the slots 41 of the rear panel by means of a screw or similar device passing through the hole 43a of the retainer of FIG. 12 and a hole 40 in the channel of FIGS. 4 and 5. As mentioned above, the guide device 70 is deliberately omitted from FIG. 15 to better illustrate the hook 50 pin 46 relation.

The hooks, guides and retainers associated with each slide mechanism ride/slide inside or with the U-channel and are the components that attach the frame assembly 14 to the slide mechanism.

As described above, each slide mechanism may have a "U" channel, a pivot pin, and two slide retainers. The pivot pin is mounted horizontally at the front end of the channel. This is the component that engages the hook component of the frame assembly to allow the frame to swing down. The two slide retainers are attached to the bottom of their associated channel as shown in FIG. 15 but are passed through two corresponding slots in the rear panel's bottom flange or ledge 42. This retains the rear panel to the slide mechanism and allows the slide mechanism to move out approximately five centimeters from the rear panel. Each slide mechanism 16, 18 is sandwiched at the left and the right between the frame and rear panel as shown in FIG. 1.

The guide device 70 as shown in various views in FIGS. 17-20 is shown positioned within the channel of the slide mechanism 16 of FIG. 11 and serves the purpose of guiding the frame assembly in a straight path as it slides out of the rear panel. As mentioned, it slides over the pivot pin after a certain degree of withdrawal of the frame assembly from the rear panel.

A cable tray hinge 80 is shown in the closed position in FIG. 21 and in the open position in FIG. 22 and joins the rear panel to the frame. It may be provisioned with a number of fiber guides and is primarily made up of two "S" shaped components hinged together as shown. The other end of the "S" components may be hinged or otherwise attached to the rear panel and the frame, respectively, by any convenient means. The cable tray hinge allows the fiber to span the gap between the rear panel and the frame assembly while protecting it and maintaining at least a minimum bend radius.

As suggested by reference to FIGS. 1, 3 and 16, there may be two cable tray hinges mounted in the space between the rear of the frame and the rear of the rear panel, one on the right, and one on the left side of the space. For the embodiment shown, fourteen splice trays were mounted horizontally in both the right and left sides of the frame assembly 14. These trays have snap-in pivot devices which pivot on the rods 38, 40 mounted in the frame. Each tray swings out individually for accessing terminations in the particular tray and snaps in when returned to the closed position. A tray assembly may consist, for example, of a tray with fiber guides, a splice/termination holder, and may include one or more pivoting components. Fiber splice devices and similar devices (not shown) are known in the art as evidenced, for example, by the 2500 series of Fiberlok Optical Fiber Splice Devices made by the 3M TelComm Products Division of Austin, Tex., U.S.A.

Figure 23A:
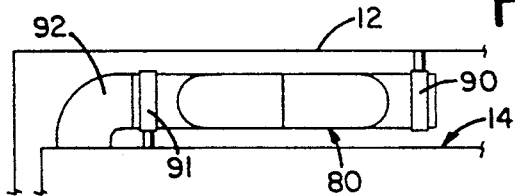
FIGS. 23A, 23B and 23C are top, front and side views, respectively, of the optical splice tray of FIG. 1 in the closed position.
Figure 23B:
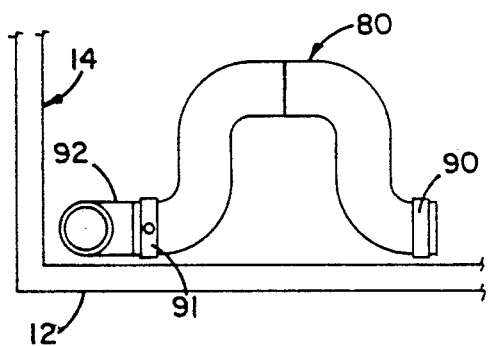
Figure 23C:
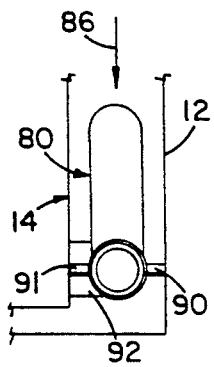

FIGS. 23A, 23B and 23C show the frame assembly in the closed position with the cable tray hinge 80 in the closed position of FIG. 21. FIG. 23A is a top view showing the cable tray hinge in the position illustrated in FIG. 21, looking in a direction of an arrow 86 shown in FIG. 21 and shown also in FIG. 23C, which is a side view. FIG. 23B is a front view of what would be seen of the cable tray hinge without the obscuring components of the frame assembly present.

Figure 24A:
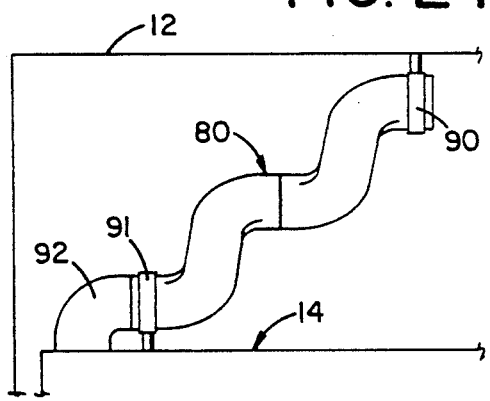
FIGS. 24A, 24B and 24C are top, front and side views of the optical splice tray of FIG. 1 in a partially open position.
Figure 24B:
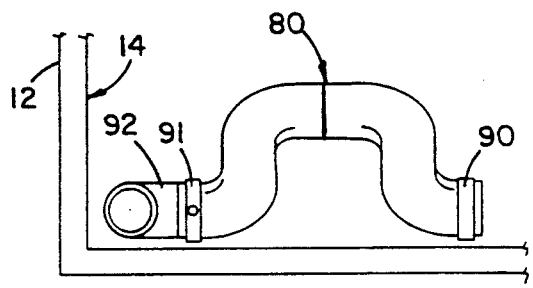
Figure 24C:
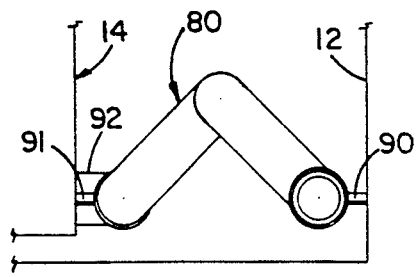

FIGS. 24A, 24B and 24C show various views of the optical splice shelf with the frame assembly slid forward to a large degree but before being in a position to swivel downwards. FIG. 24A is a top view showing the cable tray hinge 80 rotated to some degree as better shown in FIG. 24C which is a side view. FIG. 24B is a front view similar to FIG. 23B.

Figure 25A:
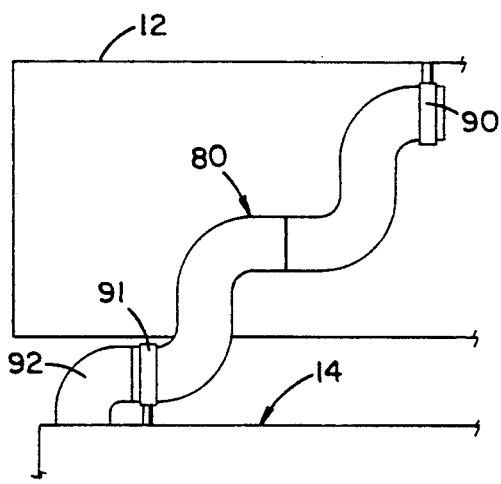
FIGS. 25A, 25B and 25C are top, front and side views, respectively, of the cable splice tray of FIG. 1 in the fully open position with the frame assembly pivoted down by ninety degrees to allow full front access to the rear panel and the back and sides of the frame assembly itself.
Figure 25B:
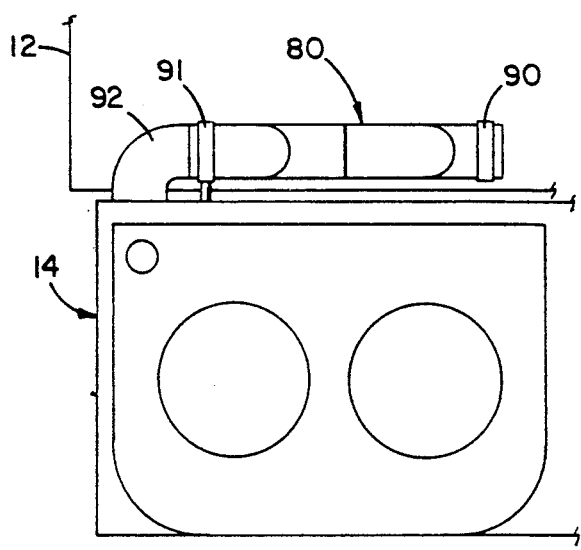
Figure 25C:
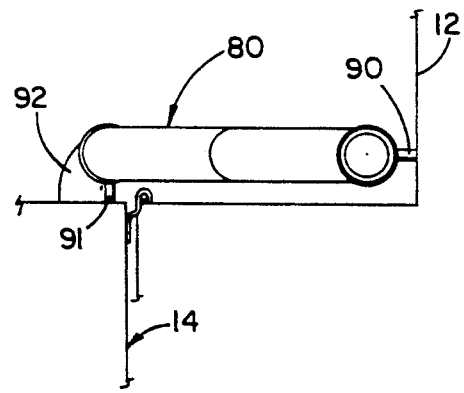

FIGS. 25A, 25B and 25C show the optical splice shelf with the frame assembly hinged down to allow access to the inside of the rear panel and to the back and sides of the frame assembly itself. FIG. 25A is a top view showing the cable tray hinge 80 in the position illustrated in FIG. 22, i.e., in the open position. FIG. 25B shows a front view of the optical splice shelf 10 wherein the frame assembly 14 has been rotated ninety degrees about the pivot point constituted by the pin 46 of FIG. 4. FIG. 25C is a side view showing the cable tray hinge 80 in the open or fully extended position of FIG. 22.

It will be noted that in all of the FIGS. 23A-25C there is shown means 90, 91 for attaching the cable tray hinge to the rear panel 12 and the frame assembly 14. Other attachment means, such as an elbow 92 may be used as well, for example. The means 90, 91 may be any convenient attachment means for attaching one end of the cable tray hinge to the rear panel 12 at a point where fiber guides (not shown) may lead fibers (not shown) into the cable tray hinge 80. Similarly, the elbow 92 may be connected to the other end of the cable tray hinge 80 in order to form a tight connection between the cable tray hinge and the frame assembly 14 while still maintaining the no less than a minimum bend radius, for one example, no less than approximately 3.8 centimeter. Of course, instead of the attachment means 90, another elbow similar to the elbow 92 could be used to route cables differently, e.g., through the rear of the rear panel.

To install fiber, the shelf assembly is pulled out in order to allow it to swing down. The inside of the rear panel will then be visible as well as the cable tray hinge which is attached from the rear panel to the rear of the frame assembly. Cable enters through side holes 100 or through a bottom gap between the rear panel and the shelf. It is then clamped against the rear panel. From the clamp and onward, all jacketing and strength members are stripped off. The fiber bundle is routed around the rear panel and into the cable tray hinge. As the fibers exit the cable tray hinge they will be fanned-out along the sides of the shelf to distribute them among the splice trays, e.g., the 14 trays on one side. The same applies to another cable tray hinge on the other side and associated trays. Now the shelf will be swung up and slid back in. Fibers will be dangling out of the front right and left sides. The splice trays may then be swung out one at a time and the appropriate fibers routed into the appropriate trays for splicing and attachment to various components, as desired.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

What is claimed is:

1. An optical splice shelf, comprising:
   a rear panel;
   a pair of slide mechanisms attached to opposite sides of the rear panel;
   a frame assembly for mounting within the rear panel and attached to the pair of slide mechanisms of permitting sliding withdrawal of the frame assembly from the rear panel, the frame assembly for housing optical splice trays; and
   a cable tray hinge attached at one end to the rear panel and at another end to the frame assembly for routing optical fibers while maintaining at least a minimum bend radius thereof with the frame assembly within the rear panel and during the sliding withdrawal of the frame assembly from the rear panel.

2. The optical splice shelf of claim 1, wherein the rear panel has a back and two opposite sides, altogether forming a U-shape, and wherein each of the opposite sides has a slotted flange used for attaching one of the pair of slide mechanisms thereto.

3. The optical splice shelf of claim 1, wherein each of the slide mechanisms comprises:
   a box channel having a longitudinal opening;
   a vertical retainer attached through the rear panel to the U-shaped channel; and
   a guide, residing inside the channel and attached to the frame assembly through the longitudinal opening.

4. The optical splice shelf of claim 1, wherein the frame assembly comprises:
   a U-shaped body;
   a top attached to the body;
   a bottom attached to the body;
   a pair of rods connecting the top and bottom;
   a plurality of splice trays stacked inside the body between the top and bottom and hinged on one or another of the pair of rods.

5. The optical splice shelf of claim 1, wherein the frame assembly has a box shape with one side open for accessing the splice trays.

6. The optical splice shelf of claim 1, wherein the frame assembly has horizontal surfaces which have slotted air passages for permitting a vertical flow of air.

7. The optical splice shelf of claim 1, wherein the frame assembly has a pair of hooks attached thereto, each for sliding engagement to a corresponding one or another of the pair of slide mechanisms, each for engaging a corresponding one or another of a pair of pivot pins, one at each end of each slide mechanism, for permitting the frame assembly to pivot about the pivot pins after the sliding withdrawal of the frame assembly from the rear panel.

8. An optical splice shelf, comprising:
   a rear panel;
   slide mechanisms attached to the rear panel each having a pivot means and each for sliding within the rear panel;
   a frame assembly mounted within the rear panel and having guide devices and pivot mechanisms attached thereto for sliding within the slide mechanisms, the guide devices for guiding the frame assembly and the pivot mechanisms for engaging the pivot means at a full extension point of the slide mechanism from the rear panel for pivoting about the pivot means for allowing front access to the rear panel; and
   at least one cable tray hinge having a pair of arms joined by a central joint wherein one arm is connected to the frame assembly and another arm is connected to the rear panel for routing optical fibers between the rear panel and the frame assembly while maintaining at least a minimum bend radius of the fibers while in a closed position, an open position and all positions between closed and open.

* * * * *

UNITED STATES PATENT AND TRADEMARK OFFICE
CERTIFICATE OF CORRECTION

PATENT NO. : 5,249,252
DATED : September 28, 1993
INVENTOR(S) : A. Noto

It is certified that error appears in the above-indentified patent and that said Letters Patent is hereby corrected as shown below:

At column 6, line 55 (claim 1, line 6), please change "of" to --for--.

Signed and Sealed this

Fifteenth Day of August, 1995

BRUCE LEHMAN

Attest:

Attesting Officer     Commissioner of Patents and Trademarks